United States Patent
Buttigieg

(10) Patent No.: US 7,104,774 B2
(45) Date of Patent: Sep. 12, 2006

(54) MOLD ASSEMBLY

(75) Inventor: Joseph Buttigieg, Farmington Hills, MI (US)

(73) Assignee: D-M-E Company, Madison Heights, MI (US)

( * ) Notice: Subject to any disclaimer, the term of this patent is extended or adjusted under 35 U.S.C. 154(b) by 231 days.

(21) Appl. No.: 10/801,183

(22) Filed: Mar. 17, 2004

(65) Prior Publication Data

US 2005/0208172 A1  Sep. 22, 2005

(51) Int. Cl.
*B29C 45/44* (2006.01)

(52) U.S. Cl. .................. 425/190; 425/441; 425/577; 425/DIG. 58

(58) Field of Classification Search ............ 425/190, 425/192 R, 183, 186, 330, 441, 443, 468, 425/577, DIG. 10, DIG. 58
See application file for complete search history.

(56) References Cited

U.S. PATENT DOCUMENTS

| 3,811,645 | A |   | 5/1974  | Feist           |         |
|-----------|---|---|---------|-----------------|---------|
| 4,383,819 | A | * | 5/1983  | Letica          | 425/577 |
| 4,768,747 | A | * | 9/1988  | Williams et al. | 249/63  |
| 5,234,329 | A |   | 8/1993  | Vandenberg      |         |
| 5,536,161 | A |   | 7/1996  | Smith, et al.   |         |
| 5,824,256 | A | * | 10/1998 | Ballester       | 264/318 |
| 6,093,015 | A |   | 7/2000  | Navarre         |         |
| 6,116,891 | A |   | 9/2000  | Starkey         |         |
| 6,126,429 | A | * | 10/2000 | Burger et al.   | 425/169 |
| 6,443,723 | B1|   | 9/2002  | Buttigieg       |         |

FOREIGN PATENT DOCUMENTS

JP   06-8286    1/1994
JP   08-281726  10/1996

OTHER PUBLICATIONS

Written Opinion of the International Searching Authority from PCT Patent Application No. PCT/US2004/036619.
Patent Abstracts of Japan, vol. 018. No. 206 (M-1591), Apr. 12, 1994: JP06-008286.
Patent Abstracts of Japan, vol. 1997. No. 2, Feb. 28, 1997: JP08-281726.

* cited by examiner

*Primary Examiner*—Duane Smith
*Assistant Examiner*—Emmanuel S. Luk
(74) *Attorney, Agent, or Firm*—John W. Gregg

(57) ABSTRACT

A mold assembly wherein a cavity for molding is defined by primary mold cavity and primary mold core elements and a supplemental core element, the primary mold cavity and primary mold core elements are carried by first and second mating mold components and the supplemental core element is carried by a slide moveable transversely relative to the direction of motion of the mating mold components. The slide is supported by the first mating mold component and has an opening therein for engaging an actuating pin supported by the second mating mold component at an angle oblique to the parting line face of the second mating mold component. The actuating pin is removably retained in a support opening in the parting line face of the second mating mold component by means accessible from the second mating mold component parting line face.

4 Claims, 2 Drawing Sheets

MOLD ASSEMBLY

I. BACKGROUND OF THE INVENTION

1. Field of the Invention

This invention relates generally to molding apparatus for injection molding and more particularly to pins for effecting movement of mold cores in mold assemblies.

2. Description of Related Art

Mold assemblies to which the present invention pertains comprise mating mold components defining at least one mold cavity, the mating mold components being carried by molding machine members moveable relative to each other for joining and separating the mold components. At least one mating component comprises a primary mold core element and at least one mating component comprises a primary mold cavity element, the mold components meeting on faces at a so called parting line of the mold assembly (so called parting line faces).

It is known to mold articles comprising features that require at least one supplemental mold core moveable relative to a mold component, for example to form a recess transverse to a primary mold core. It is known to provide such mold cores on sliding members moveable within recesses of mold components. Movement of the sliding members is advantageously effected passively with movement of mating mold components by engagement of an actuating pin mounted obliquely to the parting line of the mold assembly. Such actuating pins are known in the art as angle pins deriving from the oblique orientation in which they are mounted. Movement of the mating mold components toward and away from the parting line is translated to transverse movement of the sliding members by contact of the actuating pin with surfaces of the sliding member.

In known mold assemblies it is known for mating mold components to comprise plates for mounting the primary core elements and primary cavity elements. With known mold apparatus, the actuating pins for supplemental cores pass through the mold component plate in which they are retained and are held in place by elements on the side of a mold component plate opposite the mold component parting line face. With such known arrangements, the through holes for the actuating pins impose restrictions in respect of placement of conduits within such plates for, for example heat transfer fluids. Further, in such known mold assemblies access to the actuating pin retaining elements requires removal of the mold components from the machine members and/or disassembly of the mold components to permit removal of the actuating pin from the mold component. Consequently, in known mold assemblies the replacement of worn actuating pins is disadvantageously complicated by the removal and disassembly of mold components.

II. SUMMARY OF THE INVENTION

It is an object of the present invention to provide a mold assembly overcoming the disadvantage of known mold assemblies wherein actuating pins are retained in openings passing through the mold components and are held therein by elements accessible only from the mold component face opposite the parting line face.

It is a further object of the present invention to provide a mold assembly comprising a mating mold component wherein a supplemental core slide passive actuator is retained in the mold component by means accessible from the parting line face of the mold component.

Further objects and advantages of the invention shall be made apparent from the accompanying drawings and the following description thereof.

In accordance with the aforesaid objects the present invention provides a mold assembly comprising first and second mating mold components, one of the first and second mating mold components comprising a primary core element and the other of the first and second mating mold components comprising a primary cavity element, the first and second mating mold components meeting on parting line faces thereof, a slide member for carrying a supplemental core element, the slide member supported by and moveable relative to a first mating mold component, the slide member having an opening therein, and an actuating pin for engaging the opening in the slide member to effect movement thereof with movement of the first and second mold components relative to one another, the actuating pin being removably retained in a support opening in the parting line face of the second mating mold component by means accessible from the second mating mold component parting line face and being supported in the second mating mold component at an angle oblique to the second mating mold component parting line face.

III. BRIEF DESCRIPTION OF THE DRAWINGS

IV. DETAILED DESCRIPTION OF THE PREFERRED EMBODIMENT

For purposes of illustrating the invention, a preferred embodiment shall be described in detail with reference to the appended drawings. It is not the intention of the applicant that the invention be limited to the preferred embodiment or the details thereof thus shown and described.

Figure 1:
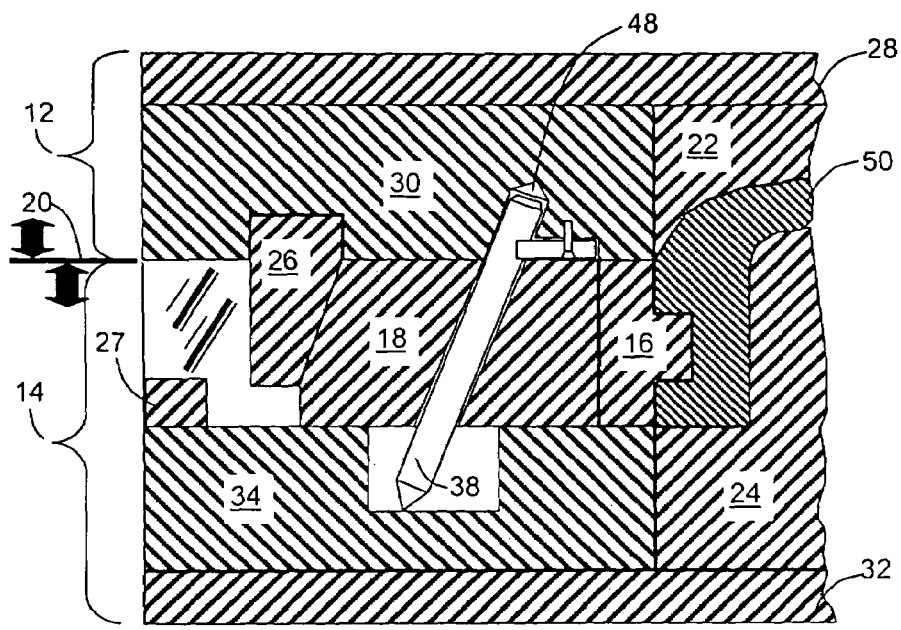
FIG. 1 is a sectional view of a portion of mating mold components of a mold assembly in accordance with the invention, the mating mold components shown joined.

Referring to FIG. 1, mold assembly 10 comprises first and second mating mold components 12 and 14 and a supplemental mold core element 16 mounted to moveable slide member 18. First and second mating mold components 12 and 14 meet at faces thereof along parting line 20 and carry primary cavity and primary core elements 22 and 24 defining the shape of an article to be molded (only a portion of primary cavity and primary core elements being shown in FIGS. 1 and 2). The faces of mating mold components 12 and 14 meeting at parting line 20 are referred to herein and in the appended claims as the parting line faces. Material being molded, shown in FIG. 1 at 50, fills a mold cavity defined by primary cavity and primary core elements 22 and 24 and supplemental mold core element 16. With primary cavity and primary core elements 22 and 24 joined, slide member 18 and supplemental mold core element 16 are held in place by abutment of heel block 26 and slide member 18. Heel block 26 is fixed to mating mold component 12. Mating mold component 12 advantageously comprises cavity base plate 28 and cavity retention plate 30 to which primary cavity element 22 is secured. Mating mold component 14 advantageously comprises core base plate 32 and core retention plate 34 to which primary core element 24 is secured. While shown and described with reference to the preferred embodiment as being comprised of distinct elements, it is contemplated that mating mold component 12 may as well comprise a unitary element including primary cavity defining features formed therein. Likewise, mating mold component 14 may comprise a unitary element including a recess for slide member 18 and primary core defining features formed thereon. Further, while the supplemental mold core element is illustrated as an element distinct from the slide by which it is carried, slide member 18 may as well be a unitary element with supplemental core defining features formed thereon.

Figure 2:
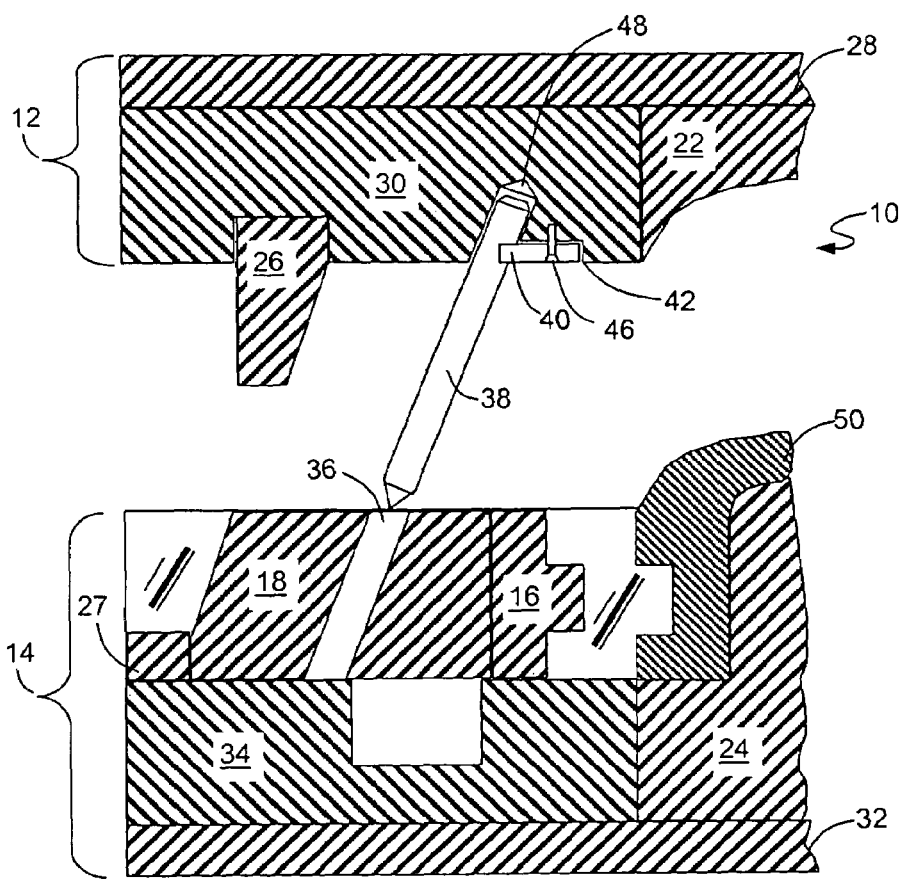
FIG. 2 is a sectional view of the portion of mating mold components of FIG. 1, the mating mold components shown separated.

Referring to FIG. 2, it will be understood that removal of a molded article requires separation of mating mold components 12 and 14. Mating mold components 12 and 14 are supported by machine members for relative movement to join and separate primary cavity and primary core mold elements 22 and 24, the movement being bi-directional as indicated by the double headed arrows at parting line 20. While in the typical injection molding machine one mating mold component is stationary and one is moveable, the present invention is concerned only with the movement of mating mold components 12 and 14 relative to each other, irrespective of whether one or both actually move. In addition to separation of primary cavity and primary core elements 22 and 24, removal of a molded article requires translation of supplemental mold core element 16 away from molded material 50. Movement of slide member 18 is effected by passive actuation through cooperation of opening 36 in slide member 18 and actuating pin 38. As shown, opening 36 and actuating pin 38 are arranged obliquely to the direction of relative movement of mating mold components 12 and 14. With actuating pin 38 engaging surfaces of opening 36, relative movement of mating mold components 12 and 14 is resolved into a component transverse to the direction of movement of the mating mold components. Hence, relative movement of the mating mold components 12 and 14 to join primary cavity and primary core elements 22 and 24 will translate slide member 18 and supplemental core element 16 toward primary core element 24 and will bring heel block 26 into abutting contact with slide member 18, as shown in FIG. 1. Relative movement of the mating mold components 12 and 14 to separate primary cavity and primary core elements 22 and 24 will relieve abutting contact of heel block 26 and will translate slide member 18 and supplemental core element 16 away from primary core element 24, as illustrated in FIG. 2. Translation of slide 18 away from primary core element 24 is halted by abutting contact of slide 18 and stop block 27.

In accordance with the invention, actuating pin 38 is removably retained in support opening 48 in the parting line face of mating mold component 12, support opening 48 being closed within mating mold component 12. Actuating pin 38 is inserted into and removed from support opening 48 from the parting line face of mold component 12. Actuating pin 38 is removably retained in support opening 48 by means accessible at the parting line face of mating mold component 12. As seen in FIG. 2, key 40 is mounted to the parting line face of mating mold component 12 and engages notch 44 (FIG. 3) of actuating pin 38 to hold actuating pin 38 in support opening 48. Key 40 is fixed to mating mold component 12 by a fastener such as screw 46. To prevent interference of key 40 and slide 18 when the parting line faces of the mating mold components meet, relief is provided in one or both of the parting line face of mating mold component 12 and the facing surface of slide 18. As shown in FIGS. 1 and 2, key 40 is received within recess 42 in the parting line face of mating mold component 12.

Figure 3:
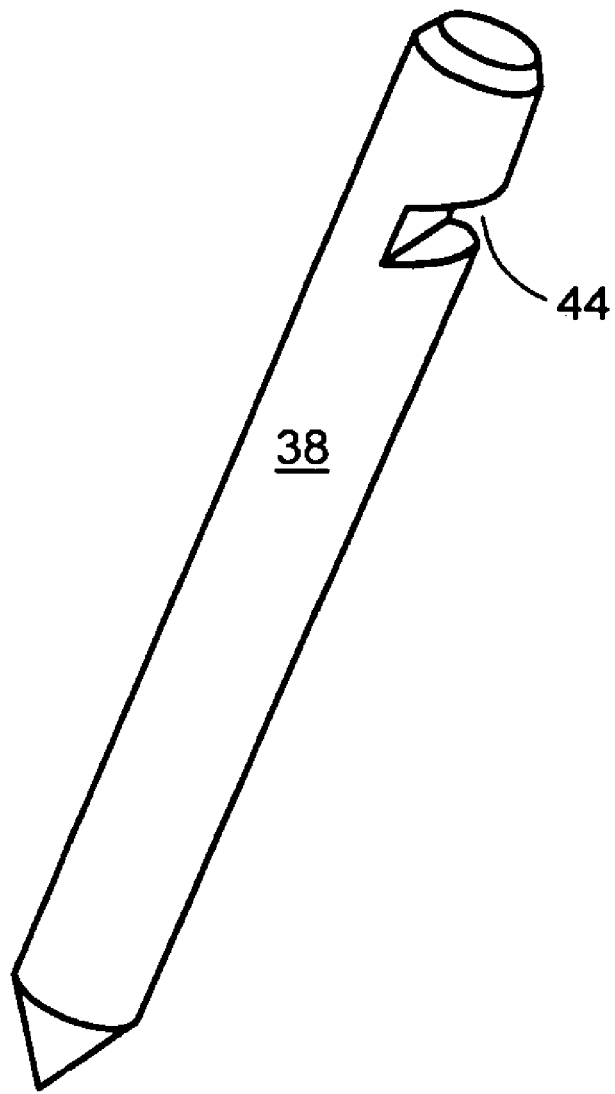
FIG. 3 is a three dimensional view of the actuating pin shown in FIG. 1.

Referring to FIG. 3, it is seen that actuating pin 38 is headless, that is, does not have an enlarged end diameter forming a shoulder for seating against a support surface. Rather, actuating pin 38 has a notch 44 in the periphery thereof, notch 44 being engaged by retaining means to retain actuating pin 38 in a support opening such as support opening 48 open only at the parting line face of mating mold component 12. Advantageously, actuating pin 38 is chamfered at the end received within support opening 48 for ease of insertion thereinto. Further, actuating pin 38 is advantageously conical at the end engaging opening 36 in slide member 18. As shown in FIG. 3, notch 44 is advantageously made to align with the line of intersection of the parting line face with the longitudinal axis of actuating pin 38 as pin 38 is oriented when retained in support opening 48. Alternatively, notch 44 may be aligned with a perpendicular to the longitudinal axis of actuating pin 38, and the relief for key 40 at the parting line made to accommodate the consequent inclination of key 40 relative to the parting line faces.

V. INDUSTRIAL APPLICABILITY

The present invention overcomes disadvantages of known arrangements for passive actuation of supplemental mold core elements wherein actuating pins are retained in openings through mating mold components by retaining means accessible only from the face of the mating mold component opposite the parting line face thereof. In particular, the present invention overcomes the need for an opening through a mating mold component, and consequently overcomes the disadvantage of such through openings restricting placement within the mating mold component of conduits for, for example, heat transfer fluid. Further, by making the means for retaining the actuating pin in the mating mold component accessible from the parting line face of the mating mold component, the need for removal and/or disassembly of mold assemblies to replace actuating pins is overcome.

While the preferred embodiment has been described in detail, it is not the intention of applicant that the invention be defined by the details of the preferred embodiment but that the invention be defined by the appended claims and all equivalents thereof.

What is claimed is:

1. A mold assembly comprising:
   a) first and second mating mold components, one of the first and second mating mold components comprising a primary core element and the other of the first and second mating mold components comprising a primary cavity element, the first and second mating components meeting on parting line faces thereof;
   b) a slide member for carrying a supplemental core element, the slide member supported by and moveable relative to a first mating mold component, the slide member having an opening therein;
   c) a headless actuating pin for engaging the opening in the slide member to effect movement thereof with movement of the first and second mating mold components relative to one another, the actuating pin being removably retained in a support opening in the parting line face of the second mating mold component, the actuating pin having a notch in the periphery thereof; and
   d) a key for engaging the notch removably attached to the second mold component by means accessible from the second mold component parting line face, the actuating pin being retained in the support opening by engagement of the notch and key at an angle oblique to the second mating mold component parting line face, whereby, with removal of the key, the actuating pin is removable from the support opening in the second mold component from the parting line face thereof.

2. The mold assembly of claim 1 wherein, with the mating mold components meeting, the key is received within a relief provided in at least one of the parting line face of the second mating mold component and the facing surface of the slide.

3. The mold assembly of claim 2 wherein the notch is aligned with the line of intersection of the parting line face with the longitudinal axis of the actuating pin as the actuating pin is oriented when retained in the second mating mold component.

4. The mold assembly of claim 2 wherein the notch is aligned with a perpendicular to the longitudinal axis of the actuating pin and the relief is made to accommodate inclination of the key to the parting line face of the mating mold component.

* * * * *